United States Patent Office 3,454,645
Patented July 8, 1969

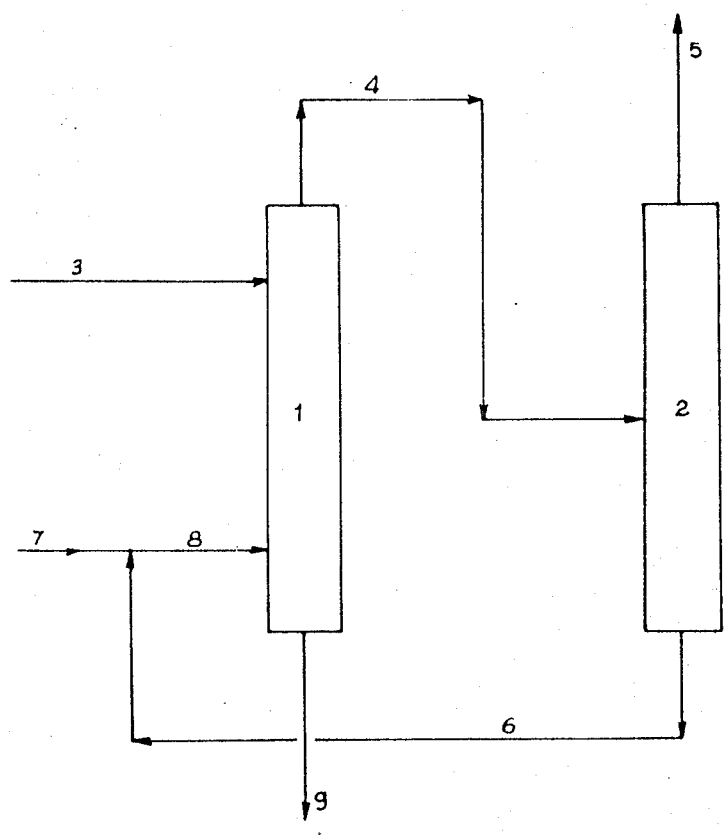

3,454,645
METHOD OF PREPARING ETHYLENEDIAMINE
Filippo Barilli, Lucio Di Fiore, and Cesare Reni, Milan, Italy, assignors to Società Italiana Resine S.p.A., Milan, Italy
Filed Jan. 17, 1967, Ser. No. 609,948
Claims priority, application Italy, Jan. 26, 1966, 1,741/66
Int. Cl. C07c 85/16
U.S. Cl. 260—583                              9 Claims

ABSTRACT OF THE DISCLOSURE

A method of preparing anhydrous or high-concentration ethylenediamine solution from a diluted aqueous solution comprising contacting a dilute sodium hydroxide solution with vaporised ethylenediamine solution by flowing them countercurrent through a column, withdrawing amine vapors from the top of said column above the azeotropic value and rectifying said amine vapors in a rectification column.

---

This invention relates to a method of preparing ethylenediamine in an anhydrous or high-concentration condition starting from its diluted aqueous solutions.

It is known from the literature that ethylenediamine forms with water a mixture boiling at a temprature of 118.7° C. at a pressure of 760 mm. Hg, evolving vapors of the same composition as the liquid, more particularly with an ethylenediamine content of 80.7% B.W. The composition of this mixture varies with pressure in the sense that at pressures below 760 mm. Hg, there exist correspondingly lower ethylenediamine concentrations.

The consequence of this behaviour is that it is not commercially possible to simply obtain, by rectification, high-concentration or anhydrous ethylenediamine. On the other hand, the use of high pressure for the rectification of these mixtures meets with difficulties in that problems of deterioration of the product and corrosion arise.

Although high-concentration or anhydrous ethylenediamine can be obtained by one or more distillations on sodium metal, or by mixing with complex salts which decompose under the action of heat and absorb water, the use of solid sodium hydroxide as a dehydrating agent was accepted in practice. The aqueous ethylenediamine solutions, as obtained simply by rectification of concentrations of a 70–75% B.W. amine, are, for example, treated with solid sodium hydroxide by either mixing the hydroxide and solution, whereby two separable layers are obtained, or, often by treating the aqueous ethylenediamine in absorption columns having beds of sodium hydroxide in granulated form.

However, the use of sodium hydroxide suffers from serious drawbacks deriving, first of all, from the manipulation of a caustic sodium material with the risks which ensue therefrom the difficulty in providing a continuous process with a constant bed of the solid caustic in the reactor which will permit operation under uniform conditions; and finally the tendency towards choking and obstructing of the equipment by the caustic sludge which is gradually formed.

It has now been found, in accordance with the object of this invention, that it is possible to prepare anhydrous or high-concentration (exceeding 90%) ethylenediamine from its diluted aqueous solutions by treatment with a diluted aqueous solution of sodium hydroxide, followed by a simple rectification process.

According to the invention we provide a method of preparing anhydrous ethylenediamine or a high-concentration ethylenediamine solution from diluted aqueous solutions which comprises contacting a dilute sodium hydroxide solution with a vaporised ethylenediamine solution by countercurrently flowing them through a column so as to obtain, at the top of the column amine vapors above the azeotropic value, and rectifying the thus obtained top vapors in a conventional rectification column.

With this method, the diluted ethylendiamine solution is fed to the foot of a column provided with filling bodies or trays, the diluted sodium hydroxide solution being fed to the top of the column. The necessary heat is supplied to the base of the column to vaporize the ethylenediamine solution, the vapors of which contact the descending sodium hydroxide soultion and become loaded with amine so that ethylenediamine vapors richer in ethylenediamine than the azeotropic composition are available at the top of the column. These vapors can be rectified in a conventional rectification column. These processes can be carried out at atmospheric pressure or at pressures below atmospheric pressure, such as between 50 and 400 mm. Hg, though operation between 100 and 200 mm. Hg is preferred. The concentration of the sodium hydroxide solution can vary within wide limits, such as 20% to 60% B.W., though the preferred embodiment of this invention utilises solutions ranging in concentration between 30% and 50% B.W. This affords further advantage that the conventional commercial sodium hydroxide solutions of about 50% by weight can be employed, thereby reducing the expenditure for work by avoiding manipulation of the solid caustic product.

The sodium hydroxide solution is discharged at the bottom of the concentration column at a lowered concentration (with respect to the feed) and contains small quantities of amine which can be fully recovered, such as by synthesis processes wherein the sodium hydroxide solution is utilized for obtaining the ethylenediamine of the corresponding hydrochlorate. Further advantages and features of the invention will become clear to one skilled in the art from the appended exemplifying description which does not, however, limit the scope of this invention.

EXAMPLE 1

500 g./hr. of an aqueous solution of sodium hydroxide of 48% B.W. are fed to the top of a column 20 mm. in diameter filled with Raschig rings 6 x 6 mm. to a height of 250 mm. 240 g./hr. of an aqueous solution of 50% B.W. ethylenediamine are fed to a flask at the bottom of the column, the flask being maintained at a temperature such that the liquid boils.

140 g./hr. 86% ethylenediamine are condensed at the top of the column, 600 g./hr. of a 40% sodium-hydroxide solution being collected at the bottom. A pressure of about 160 mm. Hg was maintained in the column.

EXAMPLE 2

FIGURE 1 diagrammatically shows the equipment, which comprises the ethylenediamine concentration column 1, described in Example 1, and the concentrate rectification column 2.

625 g./hr. sodium hydroxide solution at 48% B.W. are fed to the top of the column 1 through line 3.

155 g./hr. 65% B.W. ethylenediamine solution are fed through line 7 and are mixed with the recycled product from the foot of the distillation column 2 comprising 505 g./hr. 81% B.W. ethylenediamine solution. The total feed through line 8 is therefore 510 g./hr. 77% B.W. ethylenediamine The liquid is kept boiling at the foot of the column 1, and a pressure of about 100 mm. Hg is maintained in the equipment.

84% ethylenediamine vapours are collected through line 4, and are conveyed to the rectification column 2. 100–105 g./hr. of about 98% ethylenediamine are discharged at the top of the column 2 through line 5. About 680 g./hr. sodium hydroxide solution at 44–44.5% B.W. are discharged at the bottom of the column 1 through line 9.

What we claim is:

1. A method for concentrating an aqueous ethylenediamine solution which comprises:

contacting an aqueous sodium hydroxide solution in countercurrent flow with vaporized ethylenediamine in a packed column, the aqueous sodium hydroxide solution having a hydroxide concentration of from about 20 to about 60 percent by weight, and the amine concentration being from about 20 to about 80 percent by weight, whereby ethylenediamine vapors are obtained as a top effluent, the top ethylenediamine vapors having a concentration exceeding the concentration of an ethylenediamine-water azeotrope at the tower pressure utilized; and rectifying the ethylenediamine vapors obtained as a top effluent from the first step above, whereby high purity ethylenediamine is obtained as the top product from the rectification column, and an aqueous solution with an ethylenediamine concentration lower than the corresponding ethylenediamine-water azeotrope is obtained as a bottoms product.

2. A method as claimed in claim 1, in which a temperature is maintained at the foot of said column such that the liquid boils at operational pressure.

3. A method as claimed in claim 1, in which the operational pressure equals or is lower than the atmospheric pressure.

4. A method as claimed in claim 1, in which the operational pressure is between 100 and 200 mm. Hg.

5. A method as claimed in claim 1, in which the concentration of the sodium hydroxide solution is between about 30 percent and about 50 percent by weight.

6. A method as claimed in claim 1, in which the concentration of the original ethylenediamine solution is between about 40 percent and about 70 percent by weight.

7. A method as in claim 1 wherein the bottoms product from the rectification column is recycled to the ethylenediamine-sodium hydroxide contact column.

8. A method as in claim 1 wherein said high purity ethylenediamine product is at least 90 percent pure.

9. A method as in claim 1 wherein said high purity ethylenediamine product is substantially anhydrous.

References Cited

UNITED STATES PATENTS 2,922,818   1/1960   Spielberger et al.

CHARLES B. PARKER, *Primary Examiner.*

R. L. RAYMOND, *Assistant Examiner.*

U.S. Cl. X.R.

203—96; 260—704